June 11, 1957  G. K. C. HARDESTY  2,795,069
LAMINATED METAL-PLASTIC ILLUMINABLE PANEL
Filed Feb. 7, 1956  2 Sheets-Sheet 1
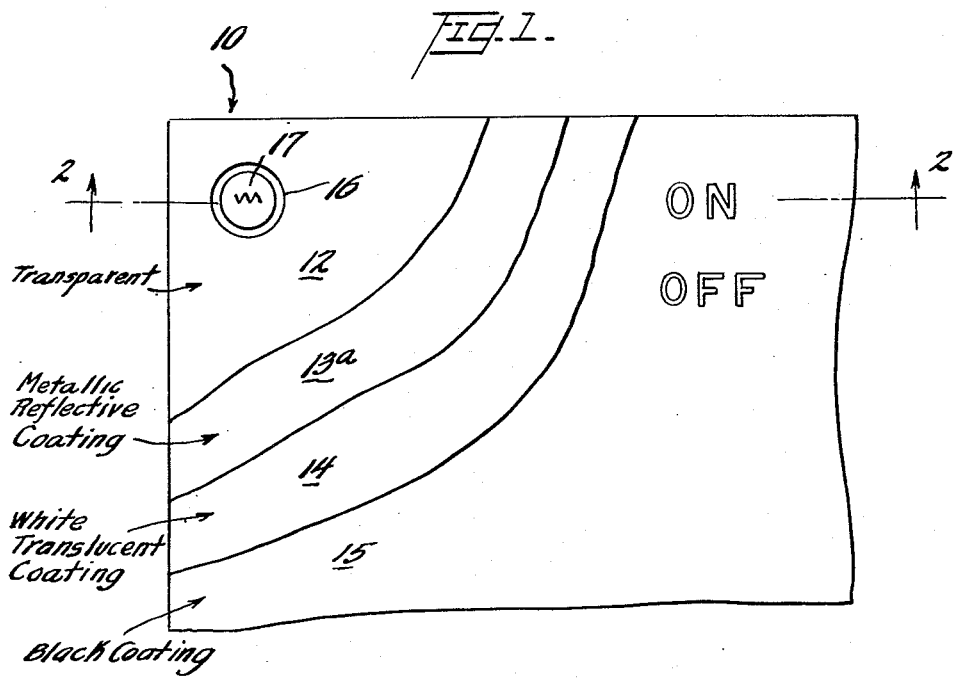
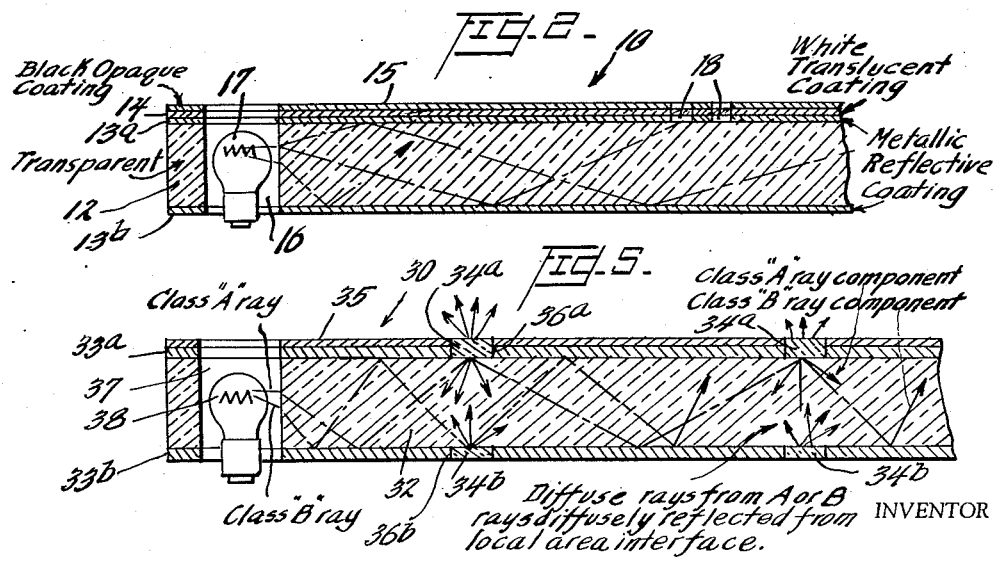
INVENTOR
George K. C. Hardesty,
BY George Sipkin
B. L. Langwell
ATTORNEYS June 11, 1957   G. K. C. HARDESTY   2,795,069
LAMINATED METAL-PLASTIC ILLUMINABLE PANEL
Filed Feb. 7, 1956   2 Sheets-Sheet 2
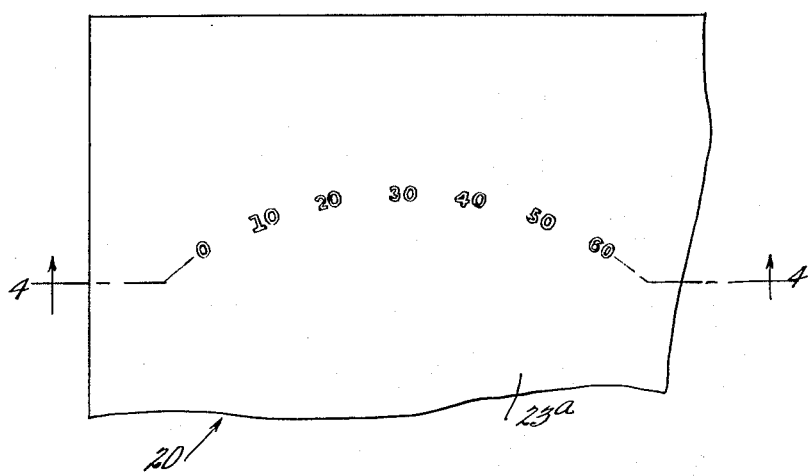
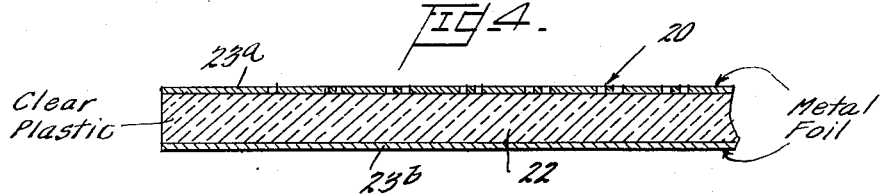
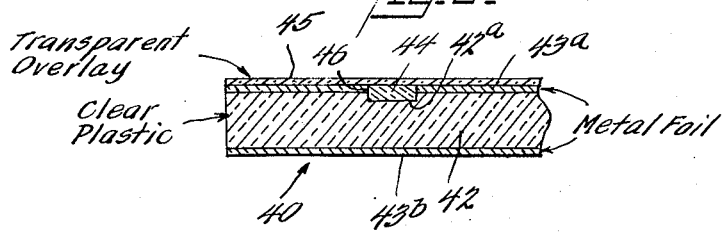
INVENTOR
George K. C. Hardesty,
BY George Sipkin
B. L. Zangwill
ATTORNEYS

2,795,069

LAMINATED METAL-PLASTIC ILLUMINABLE PANEL

George K. C. Hardesty, Mayo, Md.

Application February 7, 1956, Serial No. 564,090

6 Claims. (Cl. 40—130)

(Granted under Title 35, U. S. Code (1952), sec. 266)

The invention described herein may be manufactured and used by or for the Government of the United States of America for governmental purposes without the payment of any royalties thereon or therefor.

The present invention relates to the illumination of instrument dials and panels, and, more particularly, to the provision of an efficient edge-illuminated panel which is suited for many uses aboard ships and aircraft, and in other installations having a large number of visual indicators.

In general, the illumination of instrument dials and panels such as clocks, meters, automobile instruments and similar devices with conventional lighting means has been adequate. However, in such general applications the efficiency of the illumination and the glare produced are relatively unimportant. On the other hand many specific applications of visual indicators aboard ships and aircraft, and on other installations using large numbers of visual indicators, the use of direct lighting for dial and panel illumination would result in a complex system presenting serious problems of construction and maintenance. Furthermore, with a cluster of a large number of such instruments a direct lighting arrangement has an adverse effect on the dark adaptation of personnel and produces considerable glare which lowers the visual perception of a viewer.

In order to overcome these difficulties, resort has been made to various arrangements including edge illumination or "light-piping" of the dials and panels. One form of this type of illumination is now applied to illuminate the instrument panels and dials of aircraft and the like provides for the entrance of light energy in the form of rays into cylindrical holes distributed throughout a transparent panel member. Typically, this member has a translucent white coating applied to all surfaces except those of the holes where light is introduced and further has an opaque black field superimposed on at least one of the principal parallel surfaces to give high visual contrast with translucent white indicia formed by openings in the opaque field. The light rays introduced in the cylindrical holes pursue a somewhat indeterminate path through the panel coincident with their repeated impingement on translucent coatings upon which impingements they are partially diffusely reflected and partially diffusely transmitted into the translucent coatings. The light rays transmitted through the indicia serve to illuminate them, but the light rays diffusely reflected or refracted at a point remote from the indicia suffer great loss of light energy. Much of the loss of light is by absorption in the opaque coatings. With large areas of coating the losses of light energy result in uneven illumination of indicia distributed over the panel. The uneconomical practice of using 8 to 18 lamps per square foot of panel has resulted from this inefficient utilization of light.

In another form of edge illuminated panels, the panels comprise polished transparent glass or plastic sheets on which indicia are painted, etched, or engraved, and the appearance of an opaque field is provided by an opaque backing element on the rear surface thereof or assembled behind it. In such a form, experience has shown that difficulties with parallax and refracted images of the light energy source are present when the overall space and size of the member is restricted, as where a small dial is to be illuminated and that all physical imperfections of the polished surfaces and the panel itself act to diffusely reflect the light energy to create an objectional haze over the instrument dial.

In my copending application, Serial No. 369,976, filed July 23, 1953, for Duo-Panel Edge Illumination System, there is described an invention which has for its object the provision of an improved panel edge illumination system which is particularly suitable in locations in which the preservation of a high degree of dark adaptation of personnel is required. In that application there is described an apparatus which operates on the principle of transmission of light through a plastic sheet by total internal reflection to a second indicia-bearing sheet which is in poor optical contact with the surfaces of the first sheet. This provides an extremely efficient system since little or no light is lost.

While the duo-panel system disclosed in applicant's copending application is extremely efficient, the illuminating field is broad, and in some installations for one reason or another, such as cost of fabrication, relatively low first cost or the like, there is need for alternate means for illuminating instrument panels.

The present invention has the same general object as that described in my copending application, that is, the provision of an improved panel illumination system. However, the basic principle of the present invention is quite different, thereby providing an alternative means of accomplishing the general object.

According to the present invention, polished, metallic surfaces are optically bonded to the surfaces of an edge-illuminable plastic sheet or panel and light is transmitted by reflection between the polished metallic boundaries thus formed. This is in direct contradistinction to the principle of providing poor optical contact and thereby obtaining total internal reflection described in applicant's copending application. However, while the coefficient of reflection of a polished metallic surface is much less than that of total internal reflection, it is nearly the same for any angle of incidence. Accordingly, in accordance with the present invention, provision is made for salvaging, collimating and reflecting to the object to be illuminated, light rays having an angle of direction greater than the complement of the critical angle of the transmitting medium. The combined effect of this is to increase the total solid angle of light that may be utilized thereby increasing the efficiency of the new system.

Other objects and many of the attendant advantages of this invention will be readily appreciated as the same becomes better understood by reference to the following detailed description when considered in connection with the accompanying drawings, wherein:

Fig. 1 is a front view of a representative embodiment of the invention, and having parts broken away for clarity of illustration;

Fig. 2 is a section taken on line 2—2 of Fig. 1;

Fig. 3 is a front view of a second embodiment of the invention;

Fig. 4 is a section taken on line 4—4 of Fig. 3;

Fig. 5 is a fragmentary section, similar to Fig. 2, illustrating a third embodiment of the invention; and Fig. 6 is a fragmentary section illustrating a fourth embodiment of the invention.

For purposes of illustration, the thickness of the several laminations, shown in Figs. 2, 4, 5 and 6, is exaggerated.

Referring now to Figs. 1 and 2 of the drawings wherein the invention is shown applied to a fragment of an illuminated indicator particularly adapted for use aboard ships, aircraft, or the like. The indicator, designated generally by reference numeral 10, includes a panel or light transmitting member 12 made of a highly transparent plastic. The light transmitting panel 12 comprises a relatively large flat highly transparent plate, having its front and back surfaces in parallel relation to each other and preferably polished to provide smooth optical surfaces. The light transmitting member 12 is preferably fabricated from an acrylic resin or methyl methacrylate plastic material of the thermoplastic type such as, for example, commercial "Plexiglas" or "Lucite." The boundary surfaces of panel 12, including the major front and back surfaces are covered with a material having high specular reflectivity. This material may be polished-faced metal foil, polished metal sheets, evaporated metal deposited on the surfaces as a film, or oriented flake metallic-pigmented coatings.

As viewed in Fig. 2 the polished metal material, hereinafter referred to as metal foil, on the upper surface, the surface exposed to view, is indicated at 13a, while that on the back or lower surface is indicated at 13b. Lamination 13b may be omitted in some instances and reliance placed on the property of total internal reflectance to reflect light rays through the transparent panel 12, as described hereinafter. A translucent coating or lamination 14, preferably white, is placed over the metal foil 13a, while an opaque coating 15, preferably black, is superimposed on the translucent coating 14.

As shown in Fig. 2, one corner of the transparent panel 12 is formed with an opening 16 in which is located a miniature electric lamp 17, connected by suitable means, not shown, to a source of electric current. While but one lamp 17 is shown, a plurality of such lamps, depending upon the size and use of the indicator 10, may be suitably placed within openings therein. If desired, a filter cap, not shown, to provide only red light energy may be placed over the lamps 17.

So that the illuminable area of the translucent lamination 14 may receive light from the transparent panel 12, the metal foil lamination 13a is made discontinuous by providing apertures or the like at suitable locations therein, as indicated at 18 in Fig. 2, which apertures may be formed in any suitable manner, as described hereinafter. The apertures 18 may be in the form of letters, numerals or other indicia as "On," "Off," Fig. 1, and so that such indicia may be viewed, the black opaque lamination 14 is omitted or removed from in front of the indicia.

Referring now to Fig. 4, there are a number of processes that may be used to practice the instant invention. For example, the panel 20 may be pieces of suitable size cut from a preformed sheet of especially prepared metal foil 23a-clear plastic 22-metal foil 23b material in which the polished faces of the foil 23a and 23b have been well bonded, in optical contact, to the interfaces of the clear plastic lamination 22. Through the selective application of "resist" material, such as is used in some forms of photo-etching, portions of the front or obverse surface of the metal foil lamination is left exposed and is removed, as by chemical means. A white translucent material is then used to fill all of the openings so formed in the front, viewing surface of the laminated panel. This permits the markings, such as 0, 10, 20, etc., in Fig. 3, to be seen in the daylight by contrast to the front surface of the structure, which surface is blackened as by chemical treatment or painting, as shown at 15 in Figs. 1 and 2. This manner of applying the white translucent markings to the structure, places the material of such markings in optical contact with the clear plastic intermediate lamination 22, with the result that light transmitted through the structure will serve to illuminate the markings.

While the structure shown in Figs. 3 and 4 has been referred to herein as a second embodiment of the invention, in that such structure may be used as a finished panel, it might more appropriately be referred to as an intermediate structure used in the fabrication of a complete panel. That is, the metal foil-clear plastic-metal foil sheet 20, of Fig. 4, may be used as basic stock from which illuminable indicators, such as 10 (Fig. 2), 30 (Fig. 5) or 40 (Fig. 6) are fabricated.

The translucent markings may be any form of indicia, such as letters, "On," "Off," Fig. 1, and/or preformed numerals "0," "10," etc., Fig. 3. As the brightness of such markings is, when illuminated from the rear by the light of the clear plastic panel, a function of the light transmittance vs. the light reflectance of the translucent material employed for the markings, and as the same composition of material would generally be used for markings close to the light sources and remote therefrom, a means of local control is provided. This local control consists of careful selection of the character of reflecting areas on the rear interface of the clear plastic, intermediate lamination and in approximate juxtaposition to the markings on the front face of the structure.

With reference to Fig. 5, according to this invention, light from the sources provided can enter the transparent plastic lamination at a number of angles of incidence to the first surface presented to the light source. Upon suffering a change of direction by refraction at this first surface, some of the light would then leave the plastic lamination through one of its major plane surfaces, if there was only a plastic-air interface, as a limiting condition for "total internal reflection" would be exceeded. However, in accordance with this embodiment of the invention, I utilize a highly efficient specular reflecting surface at the surfaces of the transparent plastic sheet or intermediate lamination to reflect light between the two mirror-like interfaces without regard to limiting angles. Thus, it is possible to conserve some of the light that would have been lost to the system had reliance been placed on total internal reflection principles alone. It is obvious that a light ray striking one of the principal plane, polished, specular reflecting surfaces will be directed to the other specular surface forming the opposite interface of the transparent plastic panel. It may also be seen that all such light rays can be divided into two groups, i. e. (A) those rays that strike the boundary surface at such an angle that they would be totally internally reflected if the surface were a plastic-air interface and (B) those that would not have been so reflected but which would have been lost through the interface.

It can be seen then that a "class A" ray can usefully illuminate a translucent marking which it strikes. So can a "class B" but the "class B" would be lost to the system unless confined by a reflecting boundary not critical to angle of incidence such as a mirror-like interface. Areas on the opposite interface can be selectively changed in character from specular reflecting to diffuse reflecting to serve as sources to supplement the illumination of the markings. This can be seen in Fig. 5.

Referring now to Fig. 5, wherein there is shown a section through a fragmentary panel, illustrating a third embodiment of the invention. This panel, indicated generally by reference numeral 30, includes a highly transparent plastic base or light transmitting member 32 having a front or viewing face lamination 33a and a rear face lamination 33b. The laminations 33a and 33b are each optically bonded to the transparent panel 32 and are formed preferably of aluminum foil or sheet having high interface reflectivity. The outer or exposed face of lamination 33a is blackened chemically and/or dyed black as shown at 35. Also, lamination 33a is formed with openings 36a at desired locations for receiving markings or indicia 34a, which markings are formed of translucent plastic inserts cast into place or cemented in with compatible clear cement. Lamination 33b is formed with a like number and arrangement of openings 36b into each of which is placed an insert or inlay 34b. The inlays 34b are made of a material of highly diffuse reflectivity, such as etched surface aluminum sheet or highly pigmented, opaque plastic composition. The panel 30 is provided with an opening 37 for the reception of a lamp or light source 38. The location and surface area of the inserts 34b relative to their distance from the source of light and their relation to the markings or indicia 34a afford a local control for light rays that are diffused, collimated and reflected to the indicia or markings. Thus the brightness of the markings is controlled.

Referring now to Fig. 6, wherein an illuminable panel 40, incorporating a fourth embodiment of this invention is shown. The panel 40 includes a highly transparent plastic panel or lamination 42, to the front and rear major surfaces of which are bonded, in optical contact, metal foil laminations 43a and 43b, respectively. The front metal foil 43a is provided with a desired number of openings 46, only one of which is shown, for the reception of indicia 44. The indicia 44 are made of translucent plastic and so that they may extend into the transparent panel 42 such panel is formed with cavities 42a, only one of which is shown for the reception of the indicia. At the obverse side, the indicia are flush with the outer surface of the metal foil lamination 43a and a clear transparent panel 45 overlays the viewing surface of the panel 40. By extending or projecting the translucent indicia 44 into the transparent panel 42, light rays are intercepted and in effect "piped" from the transparent panel to the indicia. Thus, by varying the length of such projections the amount of light piped to the indicia may be varied.

Without further description, it will now be seen, in accordance with this invention, applicant has variously combined: a clear highly transparent, light transmitting panel having smooth, polished front and rear major surfaces in parallel relation with each other; a polished, metallic coating or lamination in optical contact with the front or obverse face of the light transmitting panel and having apertures therein for the reception of translucent markings or indicia which may or may not, as desired, be placed in optical contact with the polished surface of the light transmitting panel, and which may or may not, as desired, extend beneath the front surface of such panel; a translucent, indicia-forming lamination superimposed on the obverse face of the metallic lamination, or, as the case may be, individual translucent indicia in optical contact with the obverse face, or beneath the surface of such face, of the light transmitting panel; an opaque coating or lamination superimposed on the light transmitting panel either in direct contact with the obverse face of the metallic lamination or, as the case may be, in contact with the translucent coating or lamination that form the indicia, and with apertures in such opaque lamination directly in front of the indicia; a protective, transparent lamination, where desired or needed, superimposed on the obverse surface of the opaque lamination, or on the metallic lamination, as the case may be, and the individual translucent indicia; a polished metallic coating or lamination in optical contact with the rear face of the light transmitting panel, with, or without, apertures therein, as the case may be, for the reception of opaque, light diffusing and reflecting inserts, which inserts where use are selected as to surface area and location relative to the indicia on the opposite or obverse face of the panel. All so selected, combined, constructed and arranged as, not only to transmit ordinary light rays to the indicia to illuminate them, but also to salvage, collimate control and reflect to the indicia light rays that are ordinarily diffusing the reflecting inserts, which inserts where used indicia and having angles of direction greater than the complement of the critical angle of the transmitting media, which latter light rays would ordinarily be lost by absorption to surrounding opaque coatings. The combined effect of which is to increase the total solid angle of light that may be utilized thereby increasing the efficiency of the illuminating system.

Having thus described the invention, it is to be understood that the foregoing disclosure relates to only preferred embodiments of the invention and that numerous modifications or alternations may be made therein without departing from the spirit and the scope of the invention as set forth in the appended claims.

What is claimed is:

1. An illuminated indicator comprising a panel of transparent material having its front and back surfaces in parallel relation to each other and polished to provide smooth optical surfaces, a coating of high specular reflectance material bonded in optical contact on both front and back faces and edges of the panel, a light source located at an edge of said panel, the edge coating of said panel being interrupted in the vicinity of said light source for passage of light rays into and through said panel, the coating on the front face of said panel being interrupted at desired areas so as to provide openings for the transmission of light therethrough, and means in optical contact with the panel forming translucent indicia on said panel in juxtaposed relation to said openings in a manner that light rays from said light source that pass into said transparent panel are emitted therefrom through the opening in the coating material on the front face of the panel to thereby illuminate said indicia.

2. An illuminated indicator as set forth in claim 1 wherein said indicia project through the openings in the coating on the front face of said transparent panel into and beneath the surface of said panel.

3. An illuminated indicator as set forth in claim 2 wherein the length of projection of the indicia beneath the surface of the transparent panel controls the intensity of illumination of the indicia.

4. An illuminated indicator as set forth in claim 1 wherein the coating on the back face of said transparent panel is interrupted at areas to provide openings in juxtaposition with the openings in the coating on the front face of the panel, and an insert of light diffusing material located in each of the openings in the coating on the back face of the panel in a manner to collimate and reflect local light rays onto said indicia.

5. An illuminated indicator as set forth in claim 4 wherein the location and size of exposed area and coefficient of diffuse reflection of the inserts control the intensity of illumination reflected to said indicia.

6. An illuminated indicator comprising a light transmitting panel constructed of transparent material and having front and rear faces in parallel relation to each other, a polished metallic lamination in optical contact with the front face of said light transmitting panel, said metallic lamination having apertures formed therein for the reception of indicia, indicia arranged in said apertures in optical contact with said light transmitting panel, light diffusing means on the rear face of said light transmitting panel in juxtaposition to the indicia and the front face thereof, and a source of light energy adjacent an edge of said light transmitting panel for transmitting light rays thereto, the construction and arrangement being such that certain light rays transmitted to said panel are by internal reflection reflected to said indicia, whereas, other light rays transmitted to said panel are diffused by said light diffusing means and reflected to said indicia in a manner as to supplement the internally reflected light rays reflected to said indicia.

References Cited in the file of this patent
UNITED STATES PATENTS
1,937,957  Hotchner _____ Dec. 5, 1933